July 19, 1960  P. D. BARTON  2,945,465
CRUDE OIL STORAGE AND LOADING DOCK
Filed April 18, 1958  2 Sheets-Sheet 2
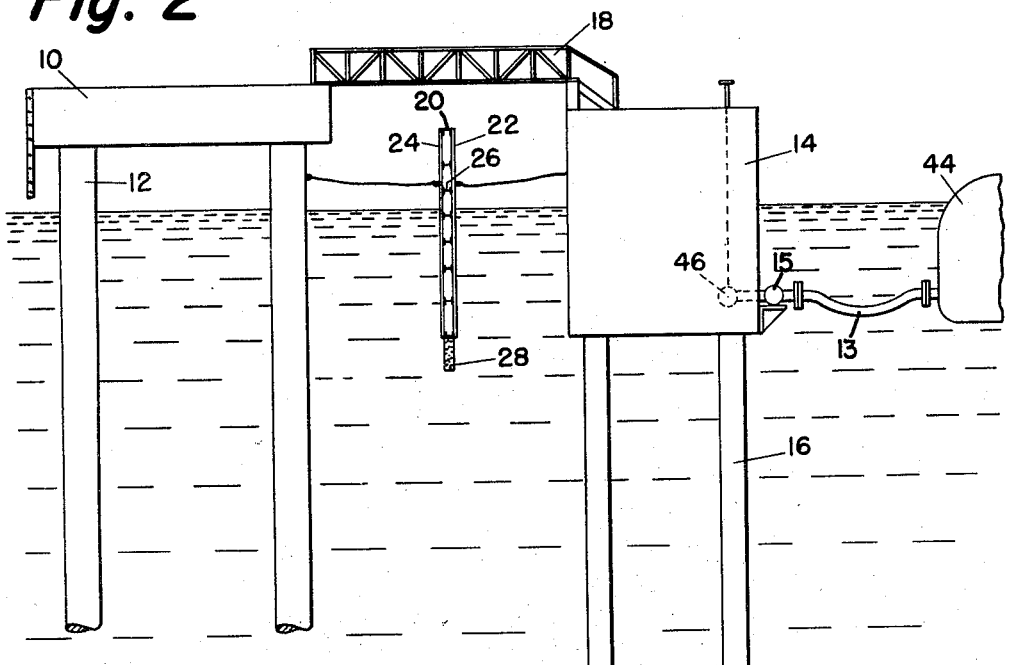
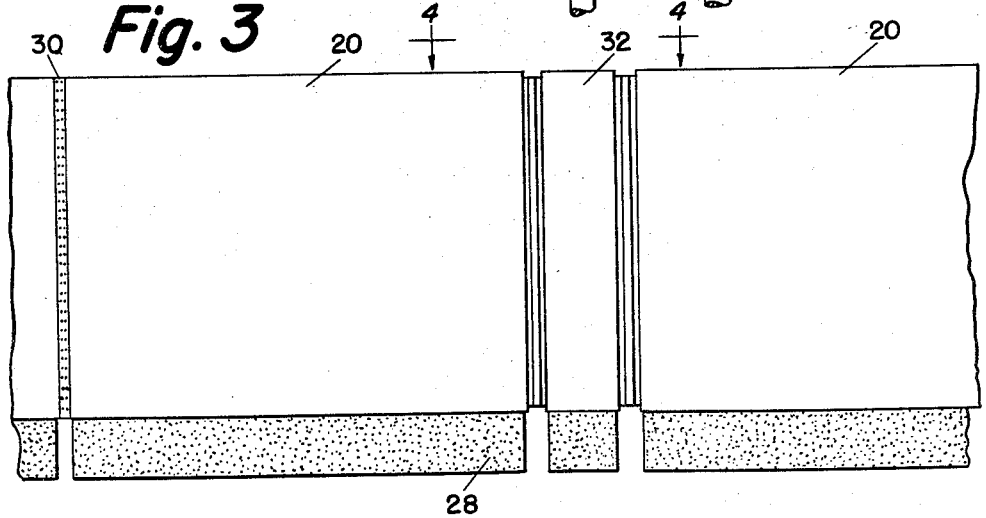
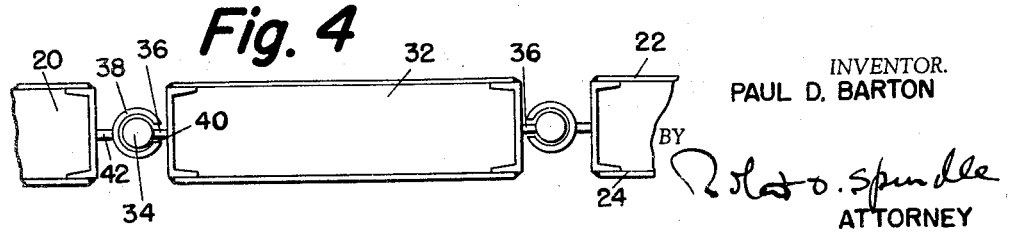
INVENTOR.
PAUL D. BARTON
BY
ATTORNEY

United States Patent Office 2,945,465
Patented July 19, 1960

2,945,465

CRUDE OIL STORAGE AND LOADING DOCK

Paul D. Barton, Phoenixville, Pa., assignor to Sun Oil Company, Philadelphia, Pa., a corporation of New Jersey Filed Apr. 18, 1958, Ser. No. 729,462

5 Claims. (Cl. 114—.5)

The present invention relates in general to storage facilities for fluids and more particularly to a floating dock and storage facilities for use with petroleum products where such products are transported in part by water.

In the movement of petroleum either as crude material for later refining or in many of petroleum's refined fluid forms, it is frequently necessary to store the cargo. This storage may be an economic measure, or it may be merely a transfer of cargo from one transport means to another. For example, the erection of storage tanks as shore line terminal facilities may be extremely expensive, if not physically impossible. Further, a transfer of such cargo from ship to shore may require several handlings in different types of water craft before the fluid reaches a storage facility of size and location in which it can remain. It is therefore an object of this invention to provide a structure which is readily available at a selected point of ship's travel to receive and store petroleum in any of its fluid forms, such storage structure being safe, accessible and inexpensive to erect and maintain.

A preferred form of structure fulfilling the requirements of the above-described object is partly in the form of a floating harbor, connected to and enclosing firmly supported docks and pumping elements. The harbor area is enclosed by a bulkhead of linked cells which are adapted to float erect at a predetermined depth in the water. Pump sumps, supported on piles, are spotted in the enclosure and attend a plurality of floating cells adapted to receive, store and release crude and fluid petroleum products. The cells are arranged in chains, each cell of the chain being linked to the other cells therein. A number of chains floating within the harbor area form the storage elements and the floating dock combination of the invention.

Objects other than that mentioned above, together with certain advantages of such a combination, will become apparent from the following description, read together with the appended drawings, in which:

Figure 2 is an elevational view, partly in section, of the portion of Figure 1 indicated by line 2—2;

Figure 3 is an elevational view of elements of the floating bulkhead taken at lines 3—3 of Figure 1; and Figure 4 is a plan view of a joint assembly of the bulkhead elements taken at line 4—4 of Figure 3.

Figure 1:
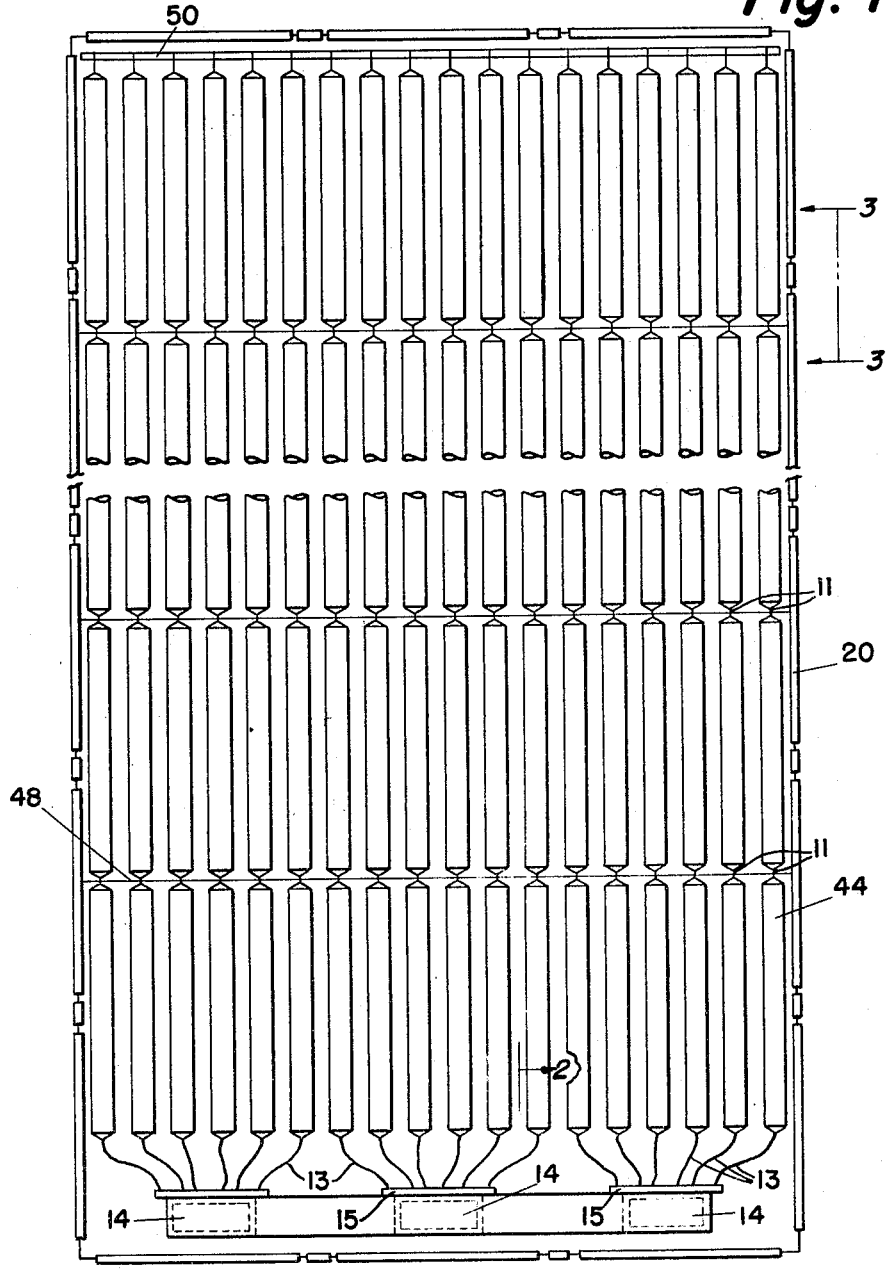
Figure 1 is a plan view of the combination of elements forming the completed storage and dock arrangement.

The storage of petroleum and its fluid products is a major problem under any conditions. At a port, either of permanent or temporary type, the basic requirement of pumping, pipelines and storage vessels is added to by the nature of the shore line, climatic conditions and small craft availability. Even when all the required facilities for loading and storage are present, their relative positions may be such that innumerable time consuming, laborious operations must be performed and repeated before the storage or loading operation is completed. It is with the elimination of these difficulties and the resultant savings that this invention is concerned.

Figure 1 shows, in plan view, the loading dock and storage facilities assembled in operating position along the shore line of any body of water. A loading dock 10 is supported by piles 12 (Fig. 2) adjacent a shore line and easily accessible from the shore and roads thereon. It will be understood that climate and weather conditions will indicate both the location and dimensions as well as the height above water, of this element of the combination. Adjacent and accessible to loading dock 10, but separated far enough for the floating bulkhead to ride between the structures, a number of pump sumps 14 are fixed in position as on piles 16 (Fig. 2). Loading dock 10 and pump sumps 14 are connected by a bridging means such as catwalk 18.

The floating bulkhead is broadly described as an articulated assembly of weighted cells rectangular in shape and flexibly jointed to have limited movement in the desired direction of peripheral alignment of these elements. More specifically, the floating cells 20 as shown in Figures 2, 3 and 4, are formed as panels having parallel sides 22—24 spaced apart and supported by structural members 26. Each of these panel-like cells is weighted as by a concrete mass 28 incorporated into the bottom of the element. The size of the concrete mass, and its density, are selected to keep the panel section to which it is attached, erect and submerged in the water to a selected depth. Several panels 20 are bolted together as at joint 30 and these connected in flexible alignment as by joint panel member 32.

Joint panel member 32 is a hollow cell panel similar in construction details to panel member 20 above described, but preferably shorter in length. A piece of pipe or cylindrical member 34 is weld-connected to joint panel member 32 by a spacing web 36. A pipe receptacle 38, slotted over its length as at 40 to pass over web 36, is spaced from panel 20 as by web 42 and forms the holding means for the element 34 projecting from the joint panel member. The size and position of the slot 40 will determine the extent of the transverse flexibility of the connected panels and the rigidity of the bulkhead member alignment. Slot position is mentioned as it will be realized flexible corners may be readily fashioned by slotting the pipe receptacle 38 at 90 degrees from the supporting web 42, rather than 180 degrees as shown in Figure 4, in order to form a right angle turn. This structure is not illustrated as it is believed evident to those of mechanical ability and it would not therefore be a patentable improvement.

The bulkhead purpose and the reasons for describing the joints as having limited movement in the direction of alignment, yet providing a degree of flexibility, will be apparent. An area of reasonably undisturbed water of sufficient depth is provided in which to float the plurality of cells 44 in orderly arrangement. By chain arrangement, in which a number of cells disposed in end-to-end relationship are connected together as at 11 to form a series of linked flow compartments, a series of substantially separated floating storage spaces is formed. Each separate chain of cells is connected by means of a flexible pipe 13 to a manifold 15 associated with a respective pumping element 46, in a particular pump sump 14. As illustrated in Figure 1, six chains of cells may be manifolded to each one of the pump sumps 14. A pumping element 46 is diagrammatically illustrated in Figure 2. By increasing the number of groups to use all the possible pumping connections available at several pump sumps as indicated in Figure 1, a storage facility of practically unlimited capacity is made available. The cells here may be either metallic or plastic, with or without air cells to improve floatability. Further, they are maintained in operable position by cables 48 or booms 50 as desired.

To those versed in the art, no example of the method of use of the above equipment is necessary. The detailed discussion of the elements forming the combination is believed sufficient. Flexibility in the pumping facilities for offshore or inshore connections to ships of tanker type, lighters and the like, or to pipelines leading to tanks or refineries, also appear evident without further explanation.

In addition, further refinements to the basic combination illustrated, defined and claimed here will be evident. Protective measures, as for example wire mesh, are easily attached to the bottom of the floating panels of the bulkhead to prevent marine life from rupturing plastic cells where used. Further, where such cells for storage are used for towing, which has been suggested as a substitute for ship bottoms, a gate arrangement in the bulkhead can easily be established. The water area in the bulkhead enclosure is then a dock for anchoring towable cell groups. It will be evident that this structure is specifically intended for use adjacent a shore line, as in bayous, rivers and lakes where such storage facilities primarily take the place of storage tanks, which latter are both costly and difficult to erect.

I claim:

1. A floating fluid storage and loading dock comprising a plurality of floating cells adapted to store fluid, inlet and discharge means operably connected to said storage cells, permanently positioned pumping means connected to said inlet and discharge means, and a stationary floating bulkhead enclosing said cells and said pumping means.

2. The floating fluid storage and loading dock of claim 1 further characterized in that the plurality of storage cells comprises several cells arranged in series forming a chain of interconnected floating storage spaces, and a group of said chains of cells connected together to one pumping means; and characterized also in that a number of said pumping means are enclosed within the floating bulkhead to serve all the storage cells enclosed within said bulkhead.

3. The floating fluid storage and loading dock of claim 1 further characterized in that the floating bulkhead enclosing the cells includes a plurality of rectangularly shaped hollow panel members weighted to float in an upright position at a selected depth, a number of said members fastened together to form a panel section of predetermined length, a jointure means of depth equal to said members but of relatively shorter length joining two of said panel sections flexibly together, and joint means of limited transverse movement uniting the jointure means with adjacent panel sections throughout the depth thereof.

4. The floating fluid storage and loading dock of claim 3 further characterized in that the joint means of limited transverse movement includes a first piece of pipe welded to extend along the edge of the panel section and longitudinally slotted the length thereof and a second piece of pipe adapted to slide internally of said first piece of pipe welded to extend along the edge of the jointure means, the welded connections of the second piece of pipe sliding in the slot of the first piece of pipe when said pipe pieces are in engagement.

5. The floating fluid storage and loading dock of claim 3 further characterized in that each weighted hollow panel member of the floating bulkhead comprises square face plates maintained in substantially parallel spaced arrangement by a plurality of spaced apart structural members, and weight means, extending the length of the member and of the same thickness, suspended from the bottom thereof.

References Cited in the file of this patent

UNITED STATES PATENTS

| | | |
|---|---|---|
| 572,364 | Midford | Dec. 1, 1896 |
| 1,171,153 | Steinmetz | Feb. 8, 1916 |
| 1,750,224 | King | Mar. 11, 1930 |
| 2,492,699 | Houwink | Dec. 27, 1949 |
| 2,594,105 | Watts | Apr. 22, 1952 |
| 2,682,151 | Simpson | June 29, 1954 |
| 2,697,442 | Anschutz | Dec. 21, 1954 |